(12) United States Patent
Wada

(10) Patent No.: US 7,463,305 B2
(45) Date of Patent: Dec. 9, 2008

(54) PHOTOGRAPHING ASSIST DEVICE AND IMAGE PROCESSING METHOD FOR ACHIEVING SIMPLE STEREOSCOPIC PHOTOGRAPHING

(75) Inventor: Shinya Wada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 875 days.

(21) Appl. No.: 10/723,296

(22) Filed: Nov. 26, 2003

(65) Prior Publication Data

US 2004/0141089 A1    Jul. 22, 2004

(30) Foreign Application Priority Data

Dec. 18, 2002 (JP) ............................. 2002-367092

(51) Int. Cl.
*H04N 13/00* (2006.01)
*H04N 15/00* (2006.01)
*H04N 13/02* (2006.01)
*H04N 5/225* (2006.01)
*G03B 35/00* (2006.01)

(52) U.S. Cl. ........................... 348/373; 348/46; 348/42; 348/218.1; 348/50; 396/324; 396/325; 396/326

(58) Field of Classification Search ................. 348/36, 348/37, 42, 50, 218.1, 39, 43, 44, 46, 207.99, 348/239, 373; 396/12, 324, 326, 329, 322, 396/325

See application file for complete search history.

(56) References Cited

U.S. PATENT DOCUMENTS

| 1,957,043 | A | * | 5/1934 | Harlow | ....................... 359/467 |
| 5,093,653 | A | | 3/1992 | Ikehira | |
| 5,640,222 | A | * | 6/1997 | Paul | ............................ 352/60 |
| 5,883,695 | A | * | 3/1999 | Paul | ............................ 352/43 |
| 2002/0033885 | A1 | * | 3/2002 | Schuler et al. | .............. 348/207 |
| 2002/0140821 | A1 | * | 10/2002 | Segev et al. | ............ 348/207.99 |

FOREIGN PATENT DOCUMENTS

| DE | 198 56 619 | | 6/2000 |
| EP | 0980181 A1 | * | 2/2000 |
| JP | 04-096585 | | 3/1992 |

(Continued)

OTHER PUBLICATIONS

International Preliminary Examination Report dated Aug. 11, 2004.

(Continued)

*Primary Examiner*—Tuan Ho
*Assistant Examiner*—Richard M Bemben
(74) *Attorney, Agent, or Firm*—Katten Muchin Rosenman LLP

(57) ABSTRACT

A photographing assist device for achieving stereoscopic photographing without the provision of a dedicated camera or a plurality of identical cameras. The photographing assist device comprises: a rotor made of a circular member having the shape of a ring; a camera fixing part for mounting a camera; and a support for supporting the rotor rotatably. A camera is placed on and fixed to the camera fixing part. When the rotor is rotated, the camera also makes a circular movement on the plane of rotation. Continuous shooting is performed during the rotation, whereby images shot from a plurality of points of view are obtained. A stereoscopic image or an interpolated image is obtained subsequently through image processing.

10 Claims, 12 Drawing Sheets

FOREIGN PATENT DOCUMENTS

| | | |
|---|---|---|
| JP | 11-150741 | 6/1999 |
| JP | 0 980 181 | 2/2000 |
| JP | 2000-241853 | 9/2000 |
| JP | 2001-16612 | 1/2001 |
| JP | 2001-145123 | 5/2001 |
| JP | 2002-044686 | 2/2002 |

OTHER PUBLICATIONS

Notification of Reason(s) for Refusal dated Mar. 18, 2008, from the corresponding Japanese Application.

Notification of Reason(s) for Refusal for corresponding Japanese Patent Application JP 2002-367092, dated Aug. 12, 2008.

* cited by examiner

PHOTOGRAPHING ASSIST DEVICE AND IMAGE PROCESSING METHOD FOR ACHIEVING SIMPLE STEREOSCOPIC PHOTOGRAPHING

BACKGROUND OF THE INVENTION

1. Field of the Invention

The present invention relates to a photographing assist device and an image processing apparatus. In particular, the present invention relates to a technology for achieving simple stereoscopic photographing.

2. Description of the Related Art

A stereoscopic image is obtained through stereoscopic photographing in which an identical subject is shot from different points of view. Parallaxes occurring in this stereoscopic image can express a sense of depth for binocular stereoscopic vision. The binocular stereoscopic vision can be achieved in various modes, including methods in which dedicated devices such as liquid crystal shutter glasses are used and naked-eye stereoscopic vision of crossing method and parallel method in which none of such special devices is used.

To obtain a stereoscopic image, it has conventionally been necessary to perform shooting by using a stereoscopic camera or perform simultaneous shooting by using a plurality of same-model cameras. Stereoscopic cameras are tailored to stereoscopic images, not suited to ordinary photographing. Moreover, those who own a plurality of same-model cameras are close to none, and if any, would not find any particular application other than stereoscopic photographing. Consequently, many have typically been hesitant to stereoscopic photographing itself.

SUMMARY OF THE INVENTION

The inventor has achieved the present invention in view of the foregoing. It is thus an object of the present invention to realize handy stereoscopic photographing with a simple configuration. The present invention has been achieved also in view of any of the following objects and other objects that will be understood from the description of this specification. To be more specific, the objects include to realize stereoscopic photographing without using a stereoscopic camera and to realize image processing for obtaining desired images by using a simple system.

One of the aspects of the present invention relates to a photographing assist device. This photographing assist device comprises: a rotor made of a member supported rotatably; and a camera fixing part for mounting a camera on the rotor, being arranged away from a center of rotation of the rotor. The camera fixing part holds the camera so that a shooting direction of the camera is generally perpendicular to a plane of rotation of the rotor.

This rotor may be formed in a ring shape or a disc shape, or made of a long or rodlike member with its center as the center of rotation. The shape does not matter as long as rotations can be made without trouble. The rotor may be provided with a tripod or other support at the center of its back. The camera may be either a digital camera or a silver film camera. The camera is mounted on the rotor, is set for continuous shooting settings, and if necessary, given timer settings. The rotor is then rotated manually, or mechanically by using a motor or the like. During the rotation of the rotor, two or more continuous shots can be taken to achieve a plurality of images shot from different points of view. The preferable interval of the continuous shooting is such that a single rotation of the rotor covers at least two shots or so. Depending on the interval, the distance(s) between the points of view, i.e., the distance(s) between the shooting positions can possibly be too close and the parallaxes too small. Thus, the number of continuous shots may be increased for a wider choice of images. Instead of the continuous shooting, each single shot may be taken with the rotor movement stopped each time the angle of rotation is changed.

The resulting plurality of images have tilts corresponding to the respective angles of rotation at the time of shooting, and the tilts can be restored to horizontal to achieve a stereoscopic image. Since the radius of the rotor, i.e., the radius of rotation of the camera is known in advance, the distance(s) between the plurality of points of view can be calculated from the angles of rotation and the radius of rotation. It is therefore possible to calculate the distance to the subject, and even generate an interpolated image or a 3D model through image interpolation.

Another aspect of the present invention also relates to a photographing assist device. This photographing assist device comprises: a rotor made of a member supported rotatably; and an imaging unit arranged in a position away from a center of rotation of the rotor to shoot a subject from the position. A shooting direction of the imaging unit is maintained perpendicular to a plane of rotation of the rotor. The imaging unit may be a camera built in the rotor.

Still another aspect of the present invention is an image processing method. This method comprises: performing continuous shooting by using a camera rotatably supported by a predetermined member at timings of different angles of rotation while the member is rotated, with a direction generally perpendicular to a plane of rotation as a shooting direction; accepting a plurality of images obtained by the continuous shooting; extracting images of objects to be parallel with each other from the plurality of images, respectively; detecting the angles of rotation from tilts of the plurality of images, respectively, with respect to the images of the objects; and relatively rotating the plurality of images based on the angles of rotation to obtain images parallel with each other.

The "predetermined member" may be a generally annular or generally disc-shaped rotor with its circular surface as the plane of rotation. The "objects to be parallel with each other" are ones that are extracted, for example, through pattern matching between the resulting plurality of images and can serve as references for detecting the angles of rotation. The "objects" are not limited to two- or three-dimensional bodies, but may be dots or lines. The number thereof does not matter, either. Alternatively, the "objects" may be the entire images. The "objects" may be selected by a user if necessary. The expression "to be parallel" means that the objects should originally look parallel with each other when the resulting plurality of images are aligned as a stereoscopic image. For such objects, ones to be originally horizontal in particular can be extracted to facilitate obtaining a stereoscopic image in which the objects look horizontal. The "images parallel with each other" may refer to images having parallel epipolar lines. The values of the "angles of rotation" may be expressed in terms of relative angles with respect to the tilt of any one of the images.

Still another aspect of the present invention is also an image processing method. This method comprises: performing continuous shooting by using a camera rotatably supported by a predetermined member at timings of different angles of rotation while the member is rotated, with a direction generally perpendicular to a plane of rotation as a shooting direction; detecting the angles of rotation at respective shooting timings during the continuous shooting; accepting a plurality of images obtained by the continuous shooting; acquiring data on the detected angles of rotation of the plurality of images, respectively; and relatively rotating the plurality of images based on the angles of rotation to obtain images parallel with each other. Again, the "predetermined member" here may be a generally annular or generally disc-shaped rotor. "Relatively rotating based on the angles of rotation" may refer to such rotations that the angles of rotation approach near zero. "Relatively rotating" covers both the cases where at least one of the plurality of images is used as a reference and the rest of the images are rotated, and where all the plurality of images are rotated.

Still another aspect of the present invention is an image processing apparatus. This apparatus comprises: an image input unit for accepting a plurality of images shot by using a camera rotatably supported by a predetermined member from positions of different angles of rotation, with a direction generally perpendicular to a plane of rotation of the member as a shooting direction; an extracting unit for extracting images of objects to be parallel with each other from the plurality of images, respectively; a tilt detecting unit for detecting the angles of rotation from tilts of the plurality of images, respectively, with reference to the images of the objects; and a rotation processing unit for relatively rotating the plurality of images based on the angles of rotation to obtain images parallel with each other.

Again, the "predetermined member" here may be a generally annular or generally disc-shaped rotor. Incidentally, when the rotor is rotated counterclockwise as viewed from the front, the angles of rotation of the resulting images increase clockwise.

This apparatus can be used to obtain a stereoscopic image in which an identical subject is shot from a plurality of points of view. Since the angles of rotation can be grasped of the plurality of images, respectively, the distance between the points of view may be determined by using the radius of rotation of the camera which is known previously. This distance between points of view can be used to calculate the distance to the subject or generate desired images such as an interpolated image.

Still another aspect of the present invention is also an image processing apparatus. This apparatus comprises: an image input unit for accepting a plurality of images shot by using a camera rotatably supported by a predetermined member from positions of different angles of rotation, with a direction generally perpendicular to a plane of rotation of the member as a shooting direction; an angle input unit for acquiring data on the angles of rotation; and a rotation processing unit for relatively rotating the plurality of images based on the angles of rotation to obtain images parallel with each other.

Again, the "predetermined member" here may be a generally annular or generally disc-shaped rotor. This rotor may be a part of a photographing assist device that has the function of measuring the angle of rotation and the function of acquiring the angle of rotation upon each shot while a plurality of images are shot continuously during the rotor rotation by using the camera mounted on the rotor. This rotor and the apparatus may be connected to transfer the data on the angles of rotation from the rotor to the apparatus. The load of the image processing may be reduced by acquiring the angle of rotation upon each shot by using a method other than image processing.

Note that applicable aspects of the present invention also include any combinations of the foregoing components, as well as the components and expressions of the present invention replaced among methods, apparatuses, systems, computer programs, recording media containing a computer program, data structures, etc.

DETAILED DESCRIPTION OF THE PREFERRED EMBODIMENTS

First Embodiment

In the present embodiment, a plurality of images are shot continuously with the aid of a photographing assist device which is achieved by a simple configuration having no electric facility such as a rotation angle sensor. Then, an image processing apparatus detects the angles of rotation from these images and obtains a stereoscopic image. That is, the angles of rotation are detected chiefly by hardware processing or software processing of a computer while the photographing assist device is achieved by a simple configuration.

Figure 1:
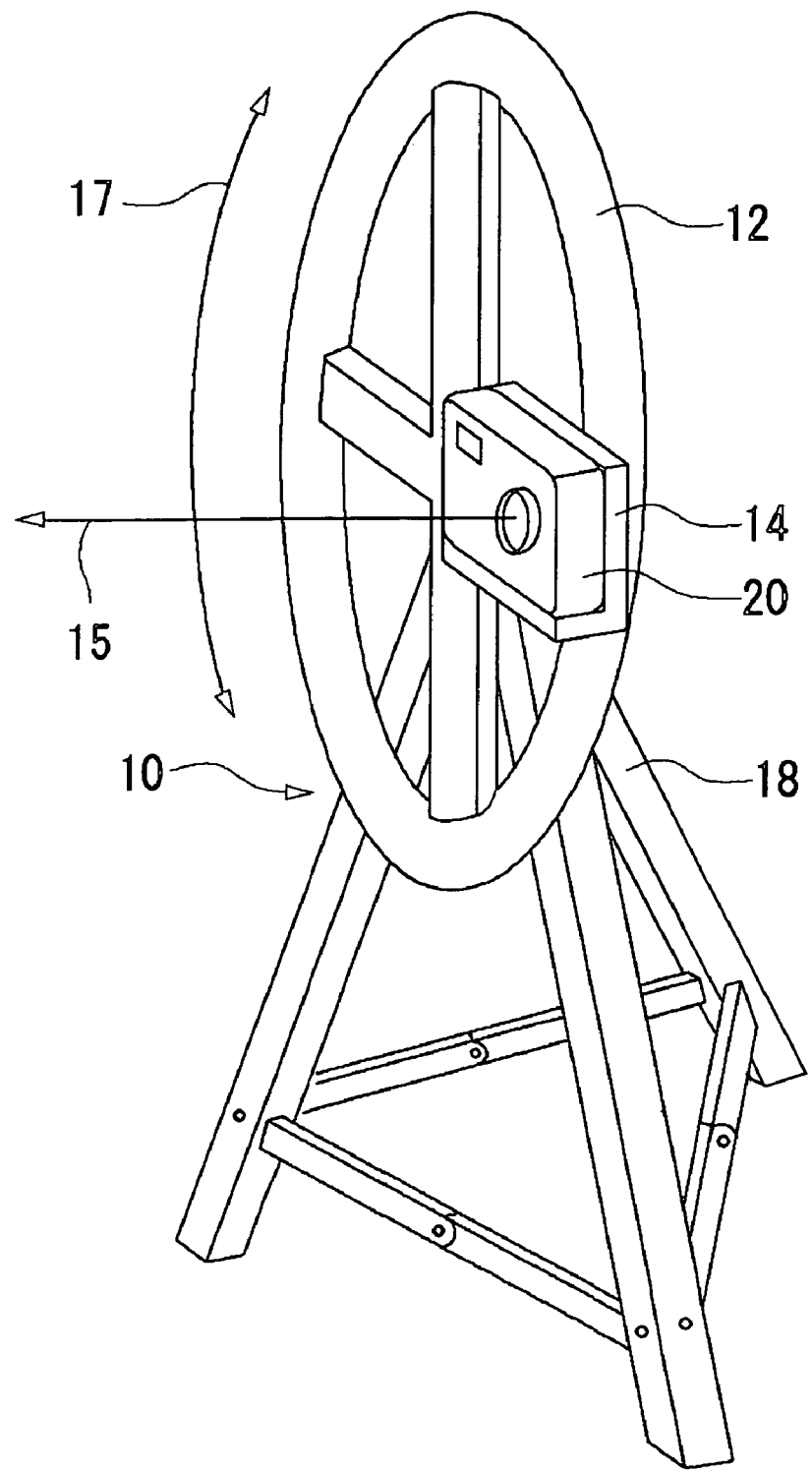
FIG. 1 is a diagram showing the appearance of a photographing assist device according to a first embodiment.

FIG. 1 shows the appearance of a photographing assist device 10 according to the present embodiment. The photographing assist device 10 comprises a rotor 12 which is made of an annular member, and a support 18 by which the rotor 12 is rotatably supported at the center of its back. The rotor 12 has a camera fixing part 14 on its front side in a position near the outer periphery thereof, i.e., in a position a predetermined distance away from the center of the rotor 12. A camera 20 can be placed on and fixed to the camera fixing part 14. In the present embodiment, the camera fixing part 14 is disposed to a position on the right as seen from the front of the rotor 12. This position shall be the starting position for rotation, i.e., 0° in the angle of rotation. In modified examples, any position may be set as 0° in the angle of rotation.

The shooting direction 15 of the camera 20 is generally perpendicular to the plane of rotation of the rotor 12. When the rotor 12 is rotated manually, the camera 20 makes a circular movement in the direction of rotation 17 while the shooting direction 15 is maintained toward the front. The circular movement is made about the center of the rotor 12 with the distance from the center to the camera 20 as the radius of rotation. Since the camera 20 is fixed to the camera fixing part 14, the shooting during the rotation of the rotor 12 also rotates the shooting range of the camera 20 accordingly. Due to the circular movement in the orbit near the outer periphery of the rotor 12, the camera 20 shoots from a plurality of points of view continuously. The rotor 12 and the support 18 have self-weights necessary to support the camera 20 and smoothen the rotation.

Figure 2:
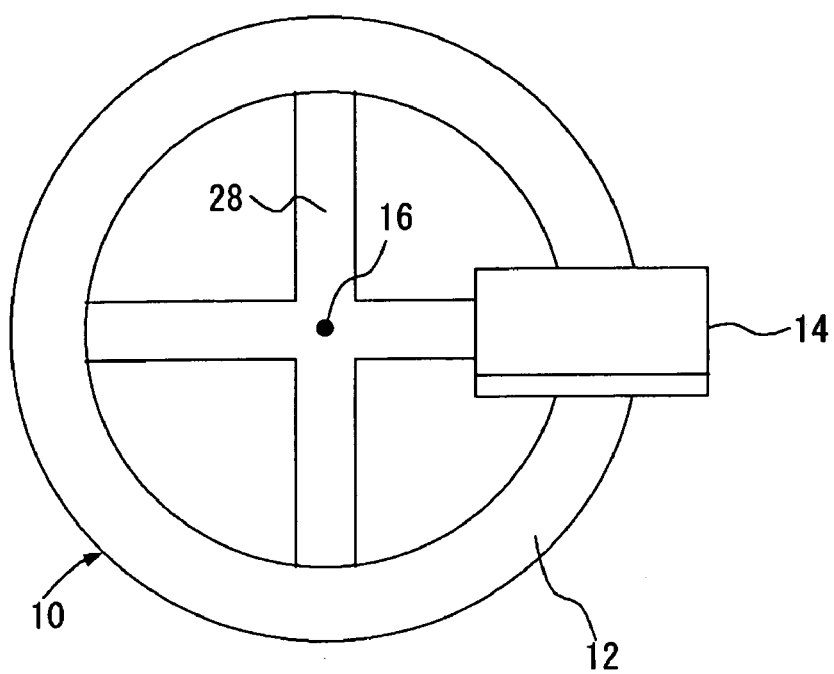
FIG. 2 is a diagram showing the appearance of a rotor as viewed from the front.

FIG. 2 shows the appearance of the rotor 12 as viewed from the front. The rotor 12 of the present embodiment is made of a circular member having the shape of a ring. The ring has a hollow in which cross spokes 28 radiate from the center. The intersection of these spokes 28, or a central point 16, is the center of rotation of the rotor 12. The backside of the central point 16 is the point of connection with the support 18. The camera fixing part 14 is arranged on the right center toward the rotor 12.

Figure 3:
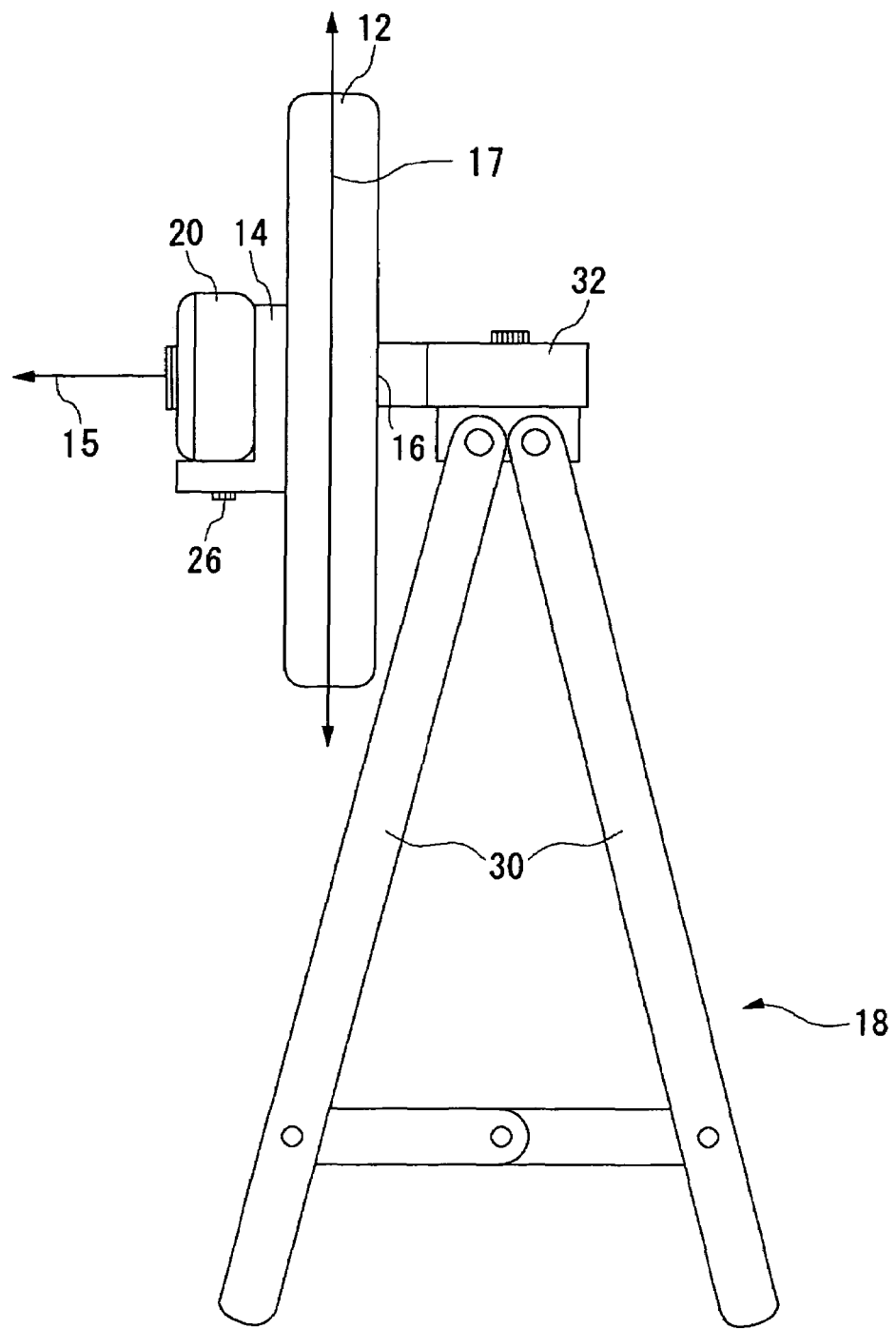
FIG. 3 is a diagram showing the appearance of the photographing assist device as viewed from a side.

FIG. 3 shows the appearance of the photographing assist device 10 as viewed from a side. The camera fixing part 14 is L-shaped in a side view, having a portion parallel to the plane of rotation and a portion perpendicular thereto. The parallel portion is in contact with the back of the camera 20. The perpendicular portion is a mount on which the camera 20 can be placed. A camera platform mechanism 26 for mounting and fixing the camera 20 is provided in a position in contact with the bottom of the camera 20. A screw of the camera platform mechanism 26 is fastened to a screw hole in the bottom of the camera 20, whereby the camera 20 is screwed and fixed onto the camera fixing part 14. The camera 20 is fixed with its shooting direction 15 generally perpendicular to the plane of rotation of the rotor 12, or the direction of rotation 17. The rotor 12 also has a connecting part 32 which is disposed to the position of the central point 16 on the backside. The support 18 is attached to the lower portion of the connecting, part 32. The support 18 includes a foldable tripod part 30. A general-purpose camera tripod may be used as the support 18. In modified examples, the rotor 12 and the support 18 may be configured integrally.

Figure 4:
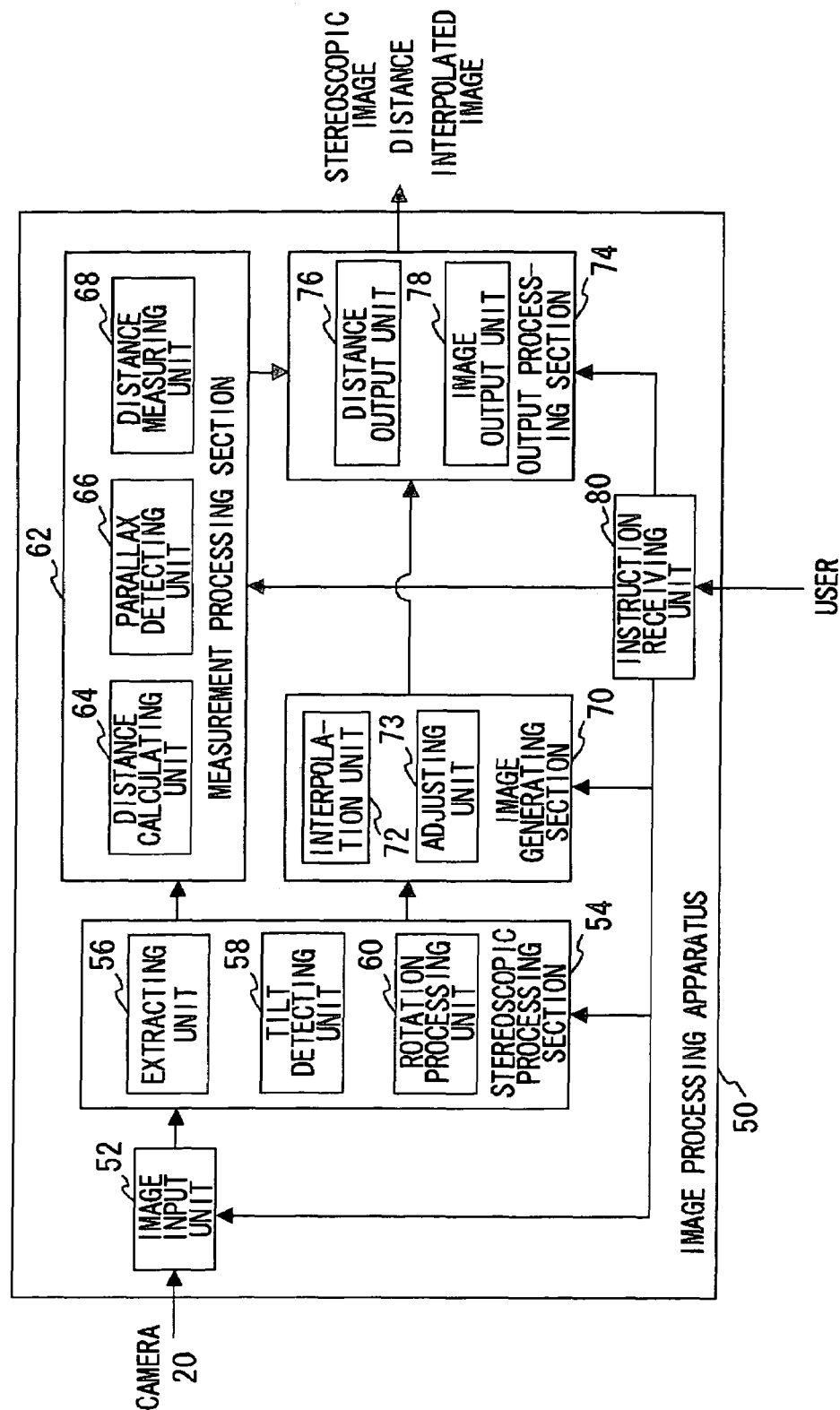
FIG. 4 is a functional block diagram of an image processing apparatus.

FIG. 4 is a functional block diagram of an image processing apparatus 50. The image processing apparatus 50 comprises an image input unit 52, a stereoscopic processing section 54, a measurement processing section 62, an image generating section 70, an output processing section 74, and an instruction receiving unit 80. The image input unit 52 accepts a plurality of images shot by the camera 20. The stereoscopic processing section 54 performs processing necessary to generate a stereoscopic image from the plurality of images accepted. The measurement processing section 62 measures the distance to the subject. The image generating section 70 obtains a desired image by using a plurality of images. The output processing section 74 outputs a stereoscopic image, distance, an interpolated image, etc. The instruction receiving unit 80 acquires user instructions.

The image processing apparatus 50, in terms of hardware, can be materialized by devices including a CPU of a computer. In terms of software, it can be achieved by a program contained on a computer-readable recording medium or the like having image processing facilities. As will be described below, FIG. 4 shows the functional blocks to be achieved by the cooperation therebetween. These functional blocks can thus be realized in various forms depending on the combination of hardware and software.

Given that the camera 20 is a digital camera, the image input unit 52 may have the function of reading a plurality of images from a recording medium removed from the camera 20, or the function of reading a plurality of images directly from the camera 20 itself through predetermined cable connection. If the camera 20 is a silver film camera, the image input unit 52 may have the function of acquiring a plurality of digital images through an externally-connected device for scanning printed photographs optically.

The stereoscopic processing section 54 includes an extracting unit 56 for extracting a reference object from an image, a tilt detecting unit 58 for detecting the tilt of an image, and a rotation processing unit 60 for rotating an image. The extracting unit 56 extracts, from the plurality of images, the images of objects to be references for detecting the tilts of the images, respectively. These references have only to be objects common to the images since it is nothing but differences in tilt between the individual images that must be obtained finally. In the case of rotating the images so that they are horizontal, the objects may be one to be horizontal references. Objects of high linearity may be extracted from the images as the images of objects to be parallel with each other.

The extracting unit 56 sets any one of a plurality of images as a reference image. For example, the first image is set as the reference image, and the rest of the images as comparison images. The comparison images may be subjected to repetitive pattern matching to search for objects common with the reference image while being rotated in steps of predetermined angles until optimum parallelism is obtained.

The pattern matching need not necessarily involve pixel-by-pixel comparison between corresponding points. Images may be divided into a plurality of blocks of predetermined size so that average pixel values in the respective blocks are subjected to mutual comparison. The rotation and pattern matching of the comparison images may be repeated while the matrixes of blocks rendered in such average values are compared between a plurality of images until the differences as to the direction of arrangement are minimized.

The tilt detecting unit 58 detects the tilt of each individual image based on the image of the object extracted. This tilt coincides with the angle of rotation of the rotor 12 at the instant when the image is shot. When the rotation of the comparison images and the pattern matching are repeated by the extracting unit 56 as described above, the tilts of the comparison images are equal to the angles of rotation of the respective images when parallelism is obtained.

The rotation processing unit 60 counterrotates the images by their respective angles of rotation detected by the tilt detecting unit 58, and thus obtains a plurality of horizontal images. As employed herein, "counterrotation" refers to rotation that eliminate the tilts of the respective images. Any rotation substantially against the rotation of the rotor 12 will do, and the direction of rotation is not actually in question. The plurality of horizontal images obtained by the rotation processing unit 60 can be used as a stereoscopic image shot from a plurality of points of view.

When the tilt of an image is none of multiples of 90°, the rectangular area of the counterrotated image becomes oblique, in which state some portions cannot be displayed in the original image size. Thus, the image size may be increased so that the image area is adjusted to cover the oblique protrusions. The resulting portions other than the oblique rectangular area, or the blank areas having no significant pixel value, may be filled with black or white. Alternatively, areas protruding obliquely from the original image size may be discarded to maintain the original image size. Again, the portions surrounding the area of significant pixel values may be filled with black or white.

The measurement processing section 62 includes a distance calculation unit 64 for calculating the distance between points of view, a parallax detecting unit 66 for detecting the parallax between a plurality of images, and a distance measuring unit 68 for calculating the distance to the subject. The distance calculating unit 64 calculates the distance between a plurality of shooting positions, or the distance between points of view, by a calculating method to be described later based on the difference between the plurality of angles of rotation detected by the tilt detecting unit 58 and the radius of rotation of the camera 20.

The parallax detecting unit 66 searches a plurality of images for corresponding points through pattern matching, and detects the parallax between the resultant corresponding points. The search for corresponding points may be applied to detected edge points alone. The method of searching for corresponding points and the method of detecting a parallax may use known techniques. The distance measuring unit 68 measures the distance to the subject pixel by pixel based on the distance and parallax between points of view. Note that distances need not be obtained for all the pixels. Only the pixels whose parallaxes are obtained by the parallax detecting unit 66 may be measured for distance. The measuring method may utilize the principle of stereovision using triangulation. The distance measuring unit 68 may measure the distance to the subject based on the distances and parallaxes among the points of view of three or more images.

The image generating section 70 includes an interpolation unit 72 for interpolating a plurality of images, and an adjusting unit 73 for applying necessary processing to images for the sake of obtaining a desired image. The interpolation unit 72 acquires the angles of rotation of the plurality of images from the tilt detecting unit 58, and determines the coordinates of the respective points of view in a virtual space based on the angles of rotation and the radius of rotation of the camera 20 which is known previously. The interpolation unit 72 interpolates a plurality of images based on the coordinates.

As employed herein, the interpolation may be either interpolation or extrapolation. Images to be shot from desired points of view are thus obtained. The interpolation unit 72 may interpolate a larger number of frames to generate a moving image or an animated image as if it is shot by moving among a plurality of points of view.

The adjusting unit 73 makes adjustments to the frame areas of a plurality of images that are rendered horizontal by the rotation processing unit 60, thereby eliminating vertical deviations. The vertical deviations may be eliminated by adjusting the area of any of the images to the horizontal direction so that epipolar lines obtained through the search for corresponding points become horizontal. The plurality of deviation-eliminated images may be used as images for right and left eyes to generate a stereoscopic image capable of binocular stereovision. The adjusting unit 73 may neglect vertical deviations as acceptable when the deviations fall below a predetermined reference value. The adjusting unit 73 may obtain homogeneous images by removing differences in image quality lying between a plurality of images.

The output processing section 74 includes a distance output unit 76 and an image output unit 78. The distance output unit 76 outputs the distance to the subject obtained by the measurement processing section 62 as a depth value (Z value) pixel by pixel. The image output unit 78 outputs images at a desired point of view, generated by the image generating section 70, such as a stereoscopic image, an interpolated image, a moving image, and an animated image.

The instruction receiving unit 80 receives operation instructions from the user, and transmits the same to such components as the image input unit 52, the stereoscopic processing section 54, the image generating section 70, the measurement processing section 62, and the output processing section 74 so that the image processing apparatus 50 performs various types of processing. The following provides examples of user instructions for the instruction receiving unit 80 to acquire. The instruction receiving unit 80 acquires from the user an instruction to read a plurality of continuously-shot images from the camera 20 or a recording medium. For example, when the plurality of read images include images of relatively closer points of view, the instruction receiving unit 80 may acquire an instruction from the user as to which image to use so that a point of view at an appropriate distance is selected.

The instruction receiving unit 80 may also acquire an instruction from the user as to which to output, a stereoscopic image, the distance to the subject, an interpolated image, a moving image, or an animated image. Such instructions are fed to the measurement processing section 62, the image processing section 70, and the output processing section 74.

Figure 5:
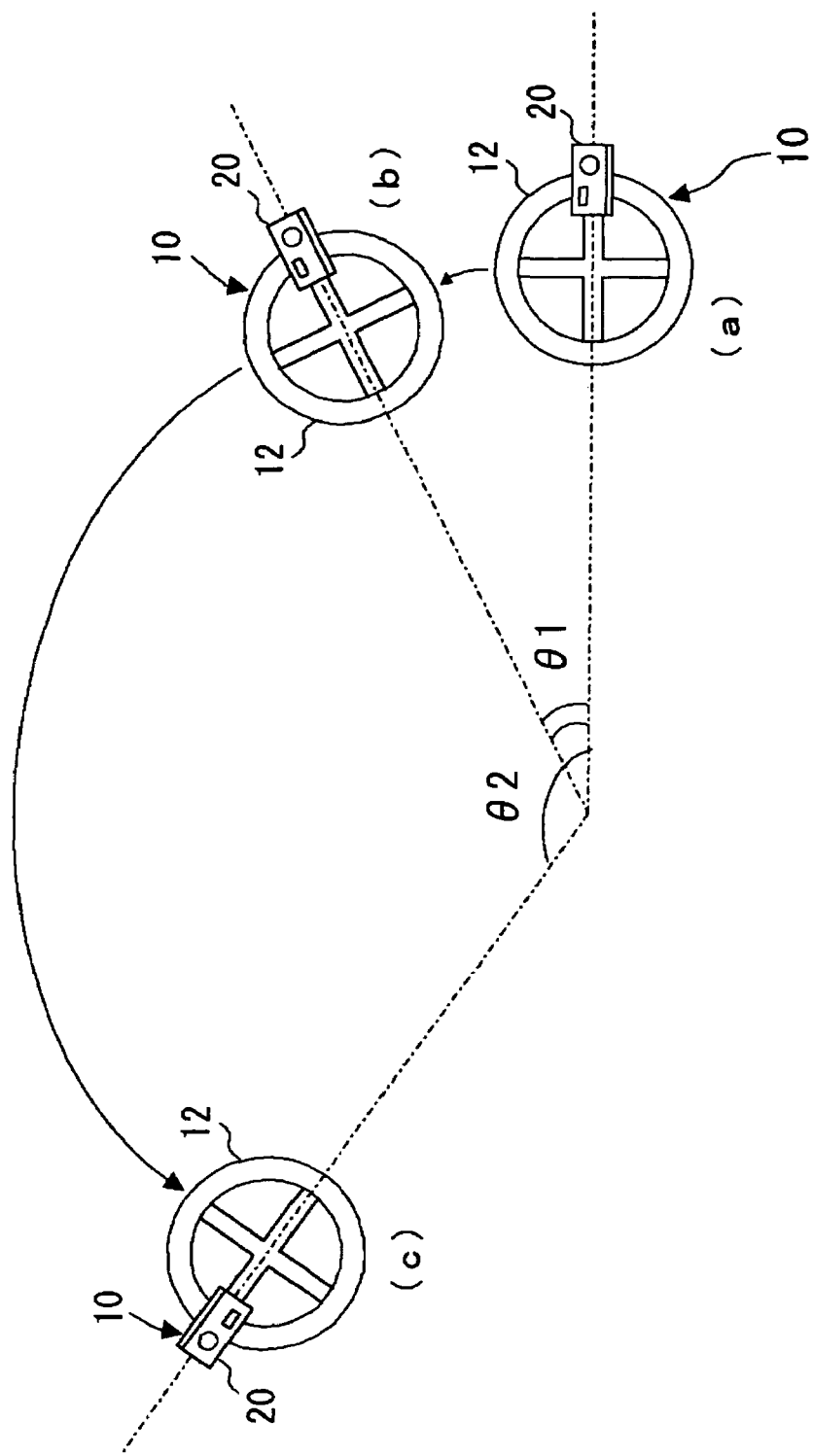
FIG. 5 is a diagram schematically showing the shooting timings when two images are shot during rotor rotation, respectively.

FIG. 5 is a diagram schematically showing the shooting timings for the case where two images are shot during rotor rotation. The continuous shooting is performed while the rotor 12 is rotated counterclockwise as seen from the front. FIG. 5(*a*) shows an initial state before the start of rotation. In this state, the camera fixing part 14 lies at the right center toward the rotor 12. The camera 20 has an angle of rotation of 0°.

FIG. 5(*b*) shows the timing for shooting the first image. As shown in the diagram, the camera 20 becomes oblique, not horizontal, as the rotor 12 is rotated. The tilt of the camera 20 in FIG. 5(*b*) is indicated as a first angle θ1. FIG. 5(*c*) shows the timing for shooting the second image. In this state, the camera 20 is also oblique, not horizontal, as the rotor 12 is rotated. The tilt of the camera 20 in FIG. 5(*c*) is indicated as a second angle θ2.

Figure 6:
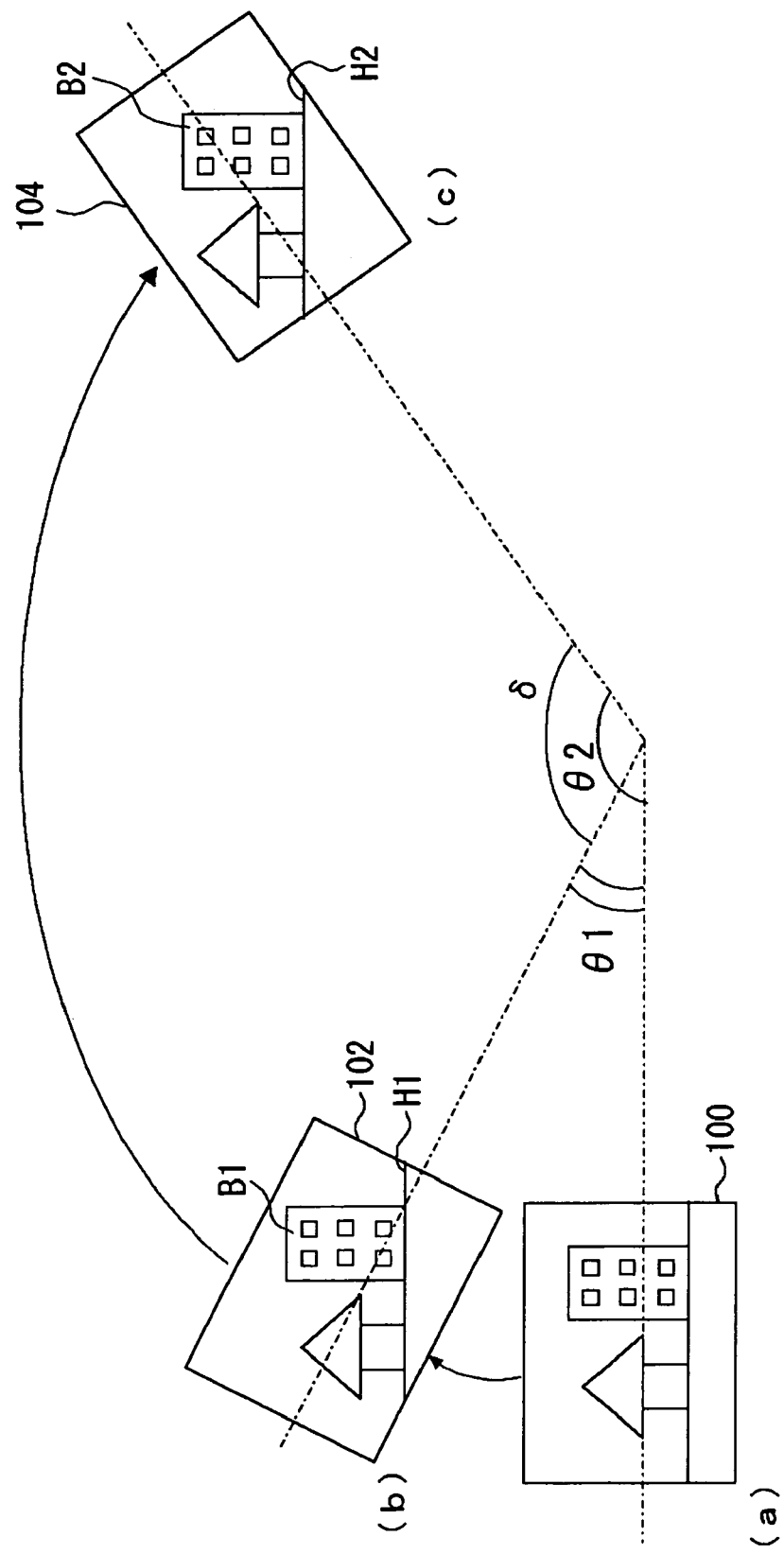
FIG. 6 is a diagram showing an original subject and two images shot continuously during rotor rotation.

FIG. 6 shows an original subject and two images shot continuously during the rotation of the rotor. This diagram is taken as viewed forward from behind the camera 20, with directions reverse to those of FIG. 5. The subject 100 in FIG. 6(*a*) is a scenic shot within the shooting range in front of the camera 20, being an example of the subject to be shot. This is the same as the scenic image viewed through a rangefinder of the camera 20 in the initial state shown in FIG. 5(*a*). The rotation is started from this state.

The rotor 12 is rotated for continuous shooting clockwise as seen in the shooting direction from behind. FIG. 6(*b*) shows a first image 102 that is shot in the state of FIG. 5(*b*). With respect to the image 100 in the initial state of FIG. 6(*a*), the first image 102 tilts by the same angle of rotation as the first angle θ1, and the subject looks oblique. FIG. 6(*c*) shows a second image 104 that is shot in the state of FIG. 5(*c*). With respect to the image 100 in the initial state of FIG. 6(*a*), the second image 104 tilts by the same angle of rotation as the second angle θ2. Again, the subject looks oblique. With the first image 102 as the reference image, the comparison image, or second image 104, tilts by a relative angle of rotation of δ from the first image 102. Here, the first and second images 102 and 104 are searched for the image of the horizon as an object common to the images. For example, a line of highest parallelism out of the subject included in the image may be considered and searched for as the horizon. Either or both of the first and second images 102 and 104 are relatively rotated so that the horizons in the respective images are parallel with each other. The angle of the relative rotation is detected to determine the angle δ.

Figure 7:
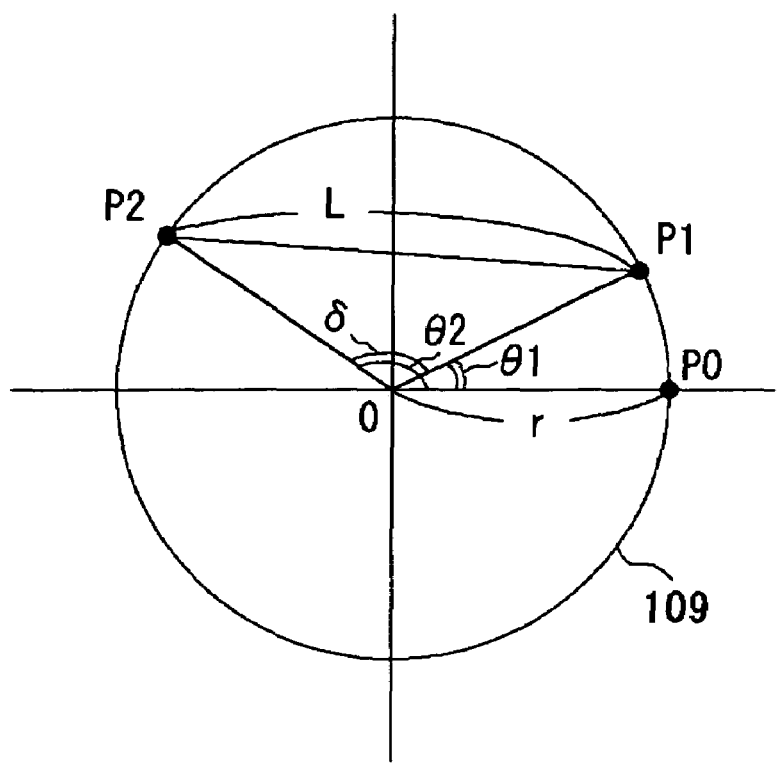
FIG. 7 is a diagram showing the relationship among the radius of rotation of a camera, the angle of rotation of the same, and the distance between points of view.

FIG. 7 shows the relationship among the radius of rotation of the camera 20, the angles of rotation of the same, and the distance between the points of view. The circle 109 shows the orbit in which the camera 20 makes a circular movement with the rotation of the rotor 12. A plurality of points of view representing respective shooting timings fall on this orbit. The radius of rotation of the camera 20 is r. Assume here that the position of the initial state shall be an initial point of view P0. The positions of the camera 20 at respective shooting timings for shooting two images continuously shall be a first point of view P1 and a second point of view P2, respectively. The initial point of view P0 corresponds to the position of FIG. 5(a), the first point of view P1 the position of FIG. 5(b), and the second point of view P2 the position of FIG. 5(c). The angle of rotation at the first point of view P1 is the first angle θ1. The angle of rotation at the second point of view P2 is the second angle θ2. A difference in angle between the first and second angles θ1 and θ2 shall be a third angle δ. IIn FIG. 6, the relative tilt of the second image 104 with respect to the first image 102 coincides with the third angle δ.

The distance between the origin 0 and the first point of view P1 and the distance between the origin 0 and the second point of view P2 both are the radius of rotation r which is known previously. When the third angle δ is known, the distance L between the first and second points of view P1 and P2 can thus be determined by using the cosine law, and defined as a function of the third angle δ. The cosine law is expressed by the equation (1), from which the equation (2) is derived:

$$L^2 = r^2 + r^2 - 2r^2 \cos\delta \quad (1)$$

$$L = r\sqrt{2(1-\cos\delta)} \quad (2)$$

The distance calculating unit 64 calculates the distance. L between the points of view by using the foregoing equation (2). This distance L corresponds to the center-to-center distance of the camera lens. In the present embodiment, the radius of rotation r is previously known since the continuous shooting is predicated on the use of the photographing assist device 10.

The third angle δ may also be determined by pattern matching, for example, using the entire images as the reference objects. More specifically, either one of the first and second images 102 and 104 is relatively rotated by a small angle for pattern matching. The small rotation and pattern matching are repeated until the entire images approximately match each other. The angle of rotation up to the approximate matching is the third angle δ. Alternatively, a plurality of objects, such as a horizon H1 and a building B1 in the first image 102 and a horizon H2 and a building B2 in the second image 104, may be used as the reference objects included in the images.

Figure 8:
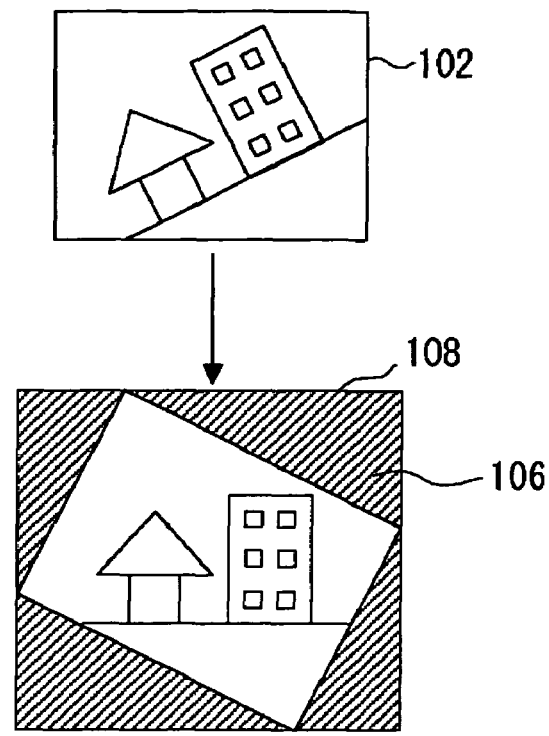
FIG. 8 is a diagram showing a first image and its counterrotated image, or a third image.

FIG. 8 shows the first image 102 and its counterrotated image, or a third image 108. The first image 102 tilts by the first angle θ1. When counterrotated by that angle, the subject becomes horizontal as in the third image 108. Since the rectangular shooting range becomes oblique, the third image 108 is given an image size greater than that of the first image 102 so as to cover the entire shooting range. As a result, blank areas 106 occur in the third image 108 around the oblique rectangular area. The blank area 106 are filled with black (zero in pixel value). The image size of the third image 106 depends on the first angle θ1. The closer to 0° or a multiple of 90° the first angle θ1 is, the smaller the image size is.

Figure 9:
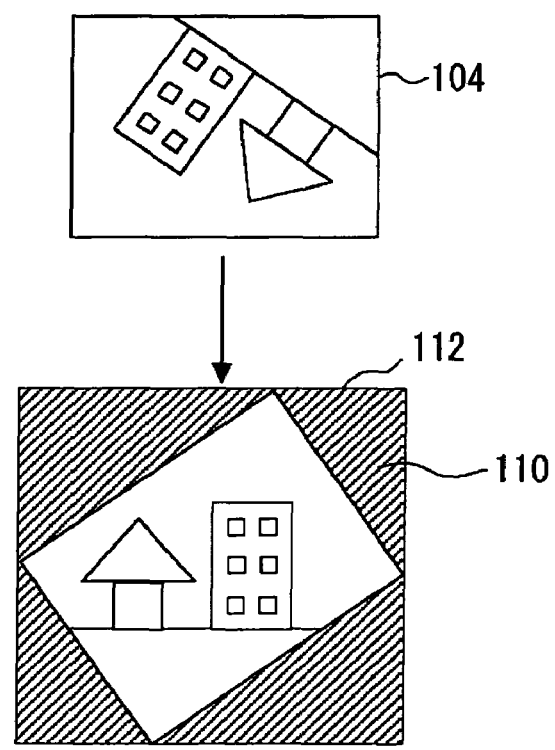
FIG. 9 is a diagram showing a second image and its counterrotated image, or a fourth image.

FIG. 9 shows the second image 104 and its counterrotated image, or a fourth image 112. The second image 104 tilts by the second angle θ2. When counterrotated by that angle, the subject becomes horizontal as in the fourth image 112. As is the case with the third image 108 in FIG. 8, the fourth image 112 is given an image size greater than that of the second image 104 so as to cover the entire shooting range. Blank areas 110 occurring in the fourth image 112 are filled with black. The image size of the fourth image 112 depends on the second angle θ2. The closer to 0° or a multiple of 90° the second angle θ2 is, the smaller the image size is. Note that the fourth image 112 does not necessarily coincide with the third image 108 in image size.

A comparison between the third image 108 in FIG. 8 and the fourth image 112 in FIG. 9 shows at least a horizontal parallax. This parallax is detected by the parallax detecting unit 66. Since the third and fourth images 108 and 112 are shot from the points of view of almost the same heights, the vertical parallax is small.

Figure 10:
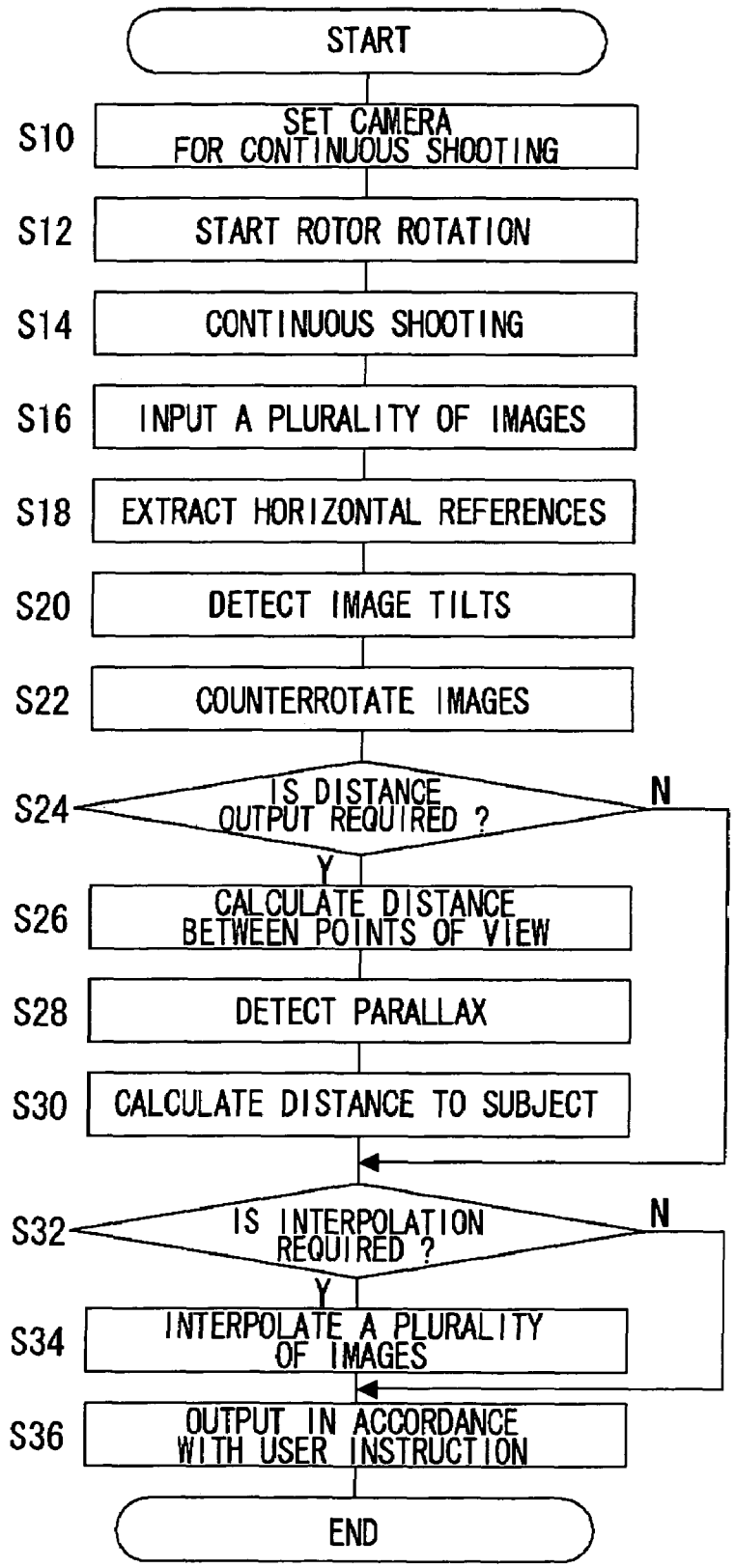
FIG. 10 is a flowchart showing the process of the first embodiment from continuous shooting to the generation of an intended image.

FIG. 10 is a flowchart showing the process of the present embodiment from continuous shooting to the generation of an intended image. Initially, the camera 20 is set for continuous shooting (S10), and the rotor 12 starts to be rotated manually (S12) so that continuous shooting is performed at a plurality of points of view (S14). The resulting plurality of images are input to the image processing apparatus 50 through the image input unit 52 (S16), so that a horizontal reference is extracted out of the plurality of images (S18). The tilts of the respective images with respect to this reference are detected (S20). The images are counterrotated by the respective angles of rotation obtained (S22). This results in a plurality of images in which the subject looks horizontal, thereby making a stereoscopic image.

If there is a user instruction to output the distance to the subject (Y at S24), the distance between the points of view of the plurality of images is calculated (S26) and the parallaxes between the plurality of images are detected (S28). The distance to the subject is calculated from the distance between the points of view and the parallaxes (S30). If there is a user instruction to output an interpolated image (Y at S32), the plurality of images are interpolated (S34). According to the user instruction, any one of the stereoscopic image, the distance to the subject, and the interpolated image is output (S36)

Second Embodiment

The photographing assist device 10 according to the present embodiment has the function of detecting the angle of rotation of the rotor 12, and thereby acquires data on the angles of rotation at respective shooting timings. The photographing assist device 10 transfers the data on the angles of rotation to the image processing apparatus 50, which uses the data for various types of processing.

Figure 11:
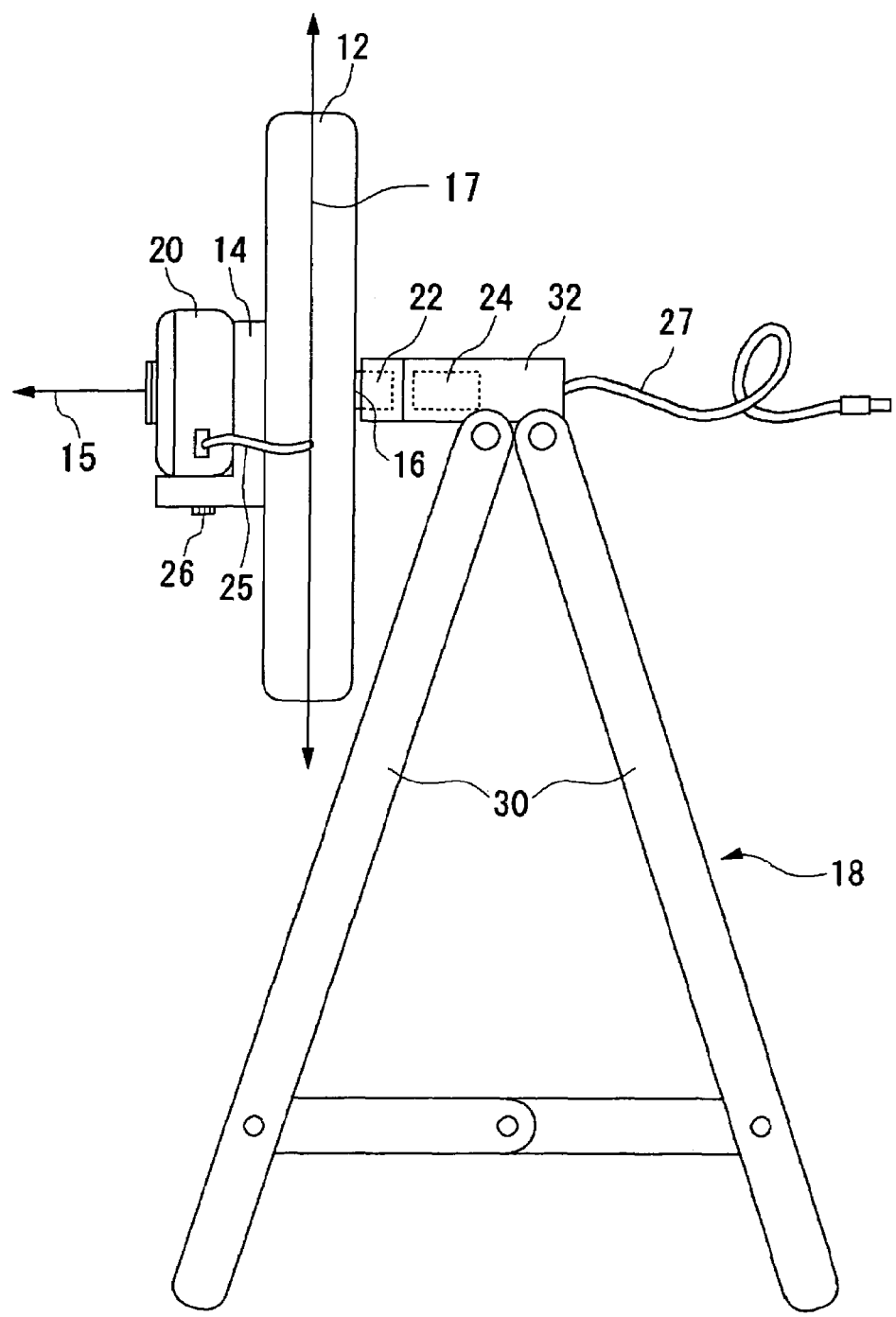
FIG. 11 is a diagram showing the appearance of the photographing assist device according to a second embodiment as viewed from a side.

FIG. 11 shows the appearance of the photographing assist device 10 according to the second embodiment as viewed from a side. The support 18 of the present embodiment has an angle detecting unit 22 and a data acquisition unit 24 which are accommodated in the connecting part 32 connected to the central point 16 on the backside of the rotor 12. The angle detecting unit 22 is an angle sensor for measuring the angle of rotation of the rotor 12. The rotation of the rotor 12 is accompanied by the rotation of a shaft inside the angle detecting unit 22. The angle of the shaft is then detected.

The data acquisition unit 24 acquires the angles of rotation at respective shots when a plurality of images are shot continuously during the rotation of the rotor 12 by using the camera 20 which is mounted on the camera fixing part 14. Signals for indicating the shooting timings or shutter timings in the continuous shooting are acquired from the camera 20 through a first cable 25. The acquired data on the angles of rotation is transferred to the image processing apparatus 50 through a second cable 27.

Figure 12:
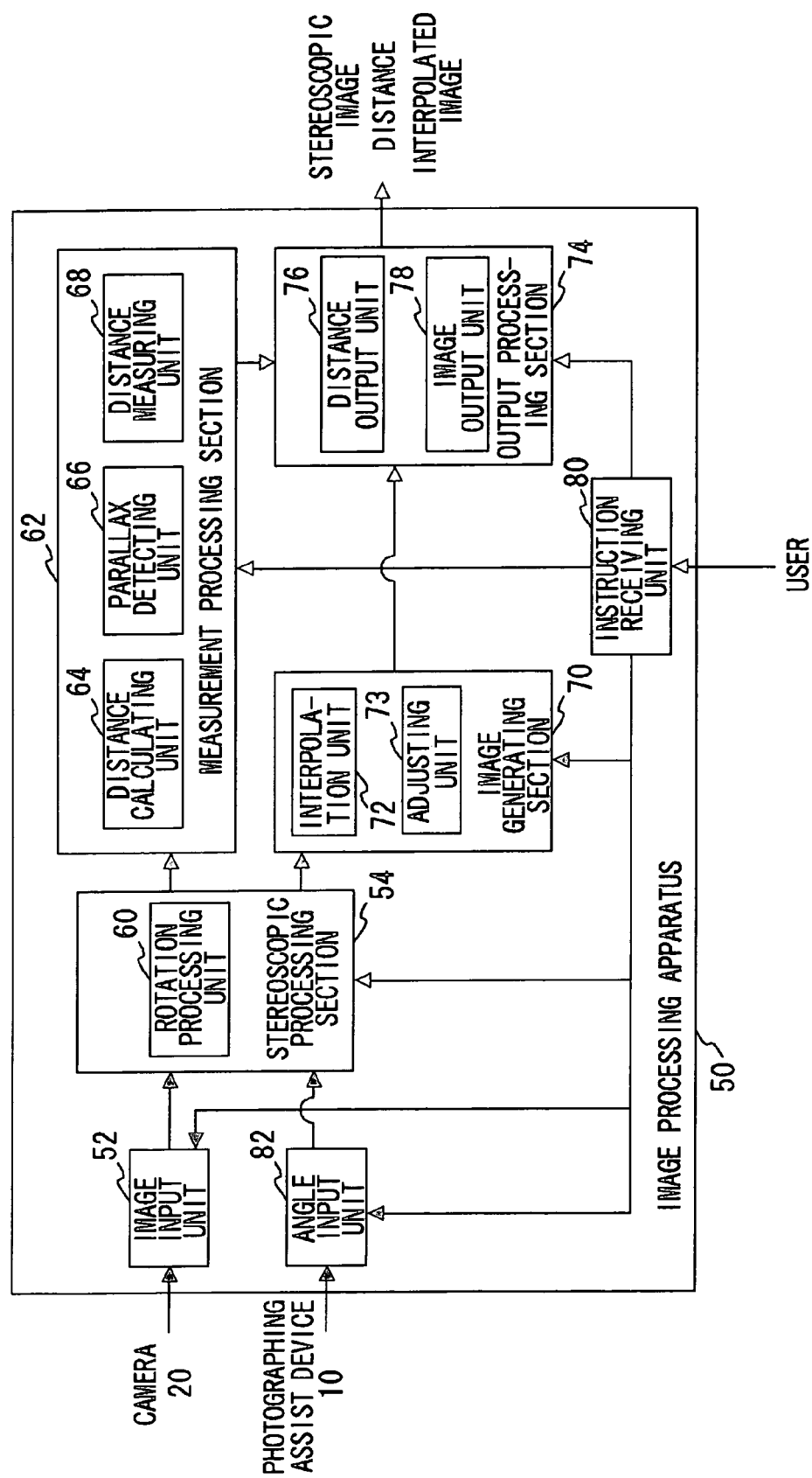
FIG. 12 is a functional block diagram of the image processing apparatus according to the second embodiment.

FIG. 12 is a functional block diagram of the image processing apparatus 50 according to the second embodiment.

The image processing apparatus 50 of the present embodiment has the same configuration as that of the image processing apparatus 50 of the first embodiment, except in the provision of an angle input unit 82 and in the internal configuration of the rotation processing unit 60.

The angle input unit 82 acquires the data on the angles of rotation at respective shooting timings from the data acquisition unit 24 of the photographing assist device 10 through the second cable 27. This data is fed to the rotation processing unit 60 of the stereoscopic processing section 54. The stereoscopic processing section 54 of the present embodiment differs from that of the first embodiment in that it does not have the functions of the extracting unit 56 and the tilt detecting unit 58. The rotation processing unit 60 counterrotates images according to the angles of rotation acquired.

Figure 13:
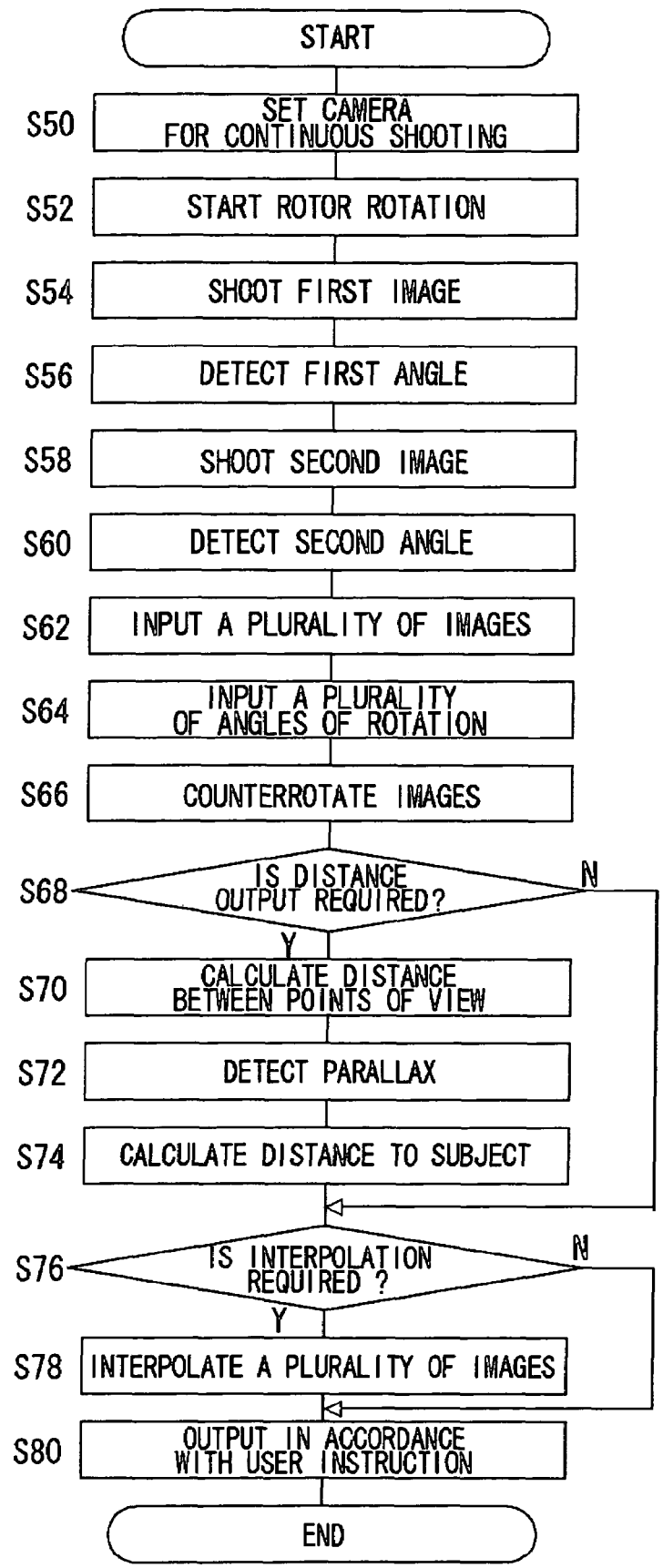
FIG. 13 is a flowchart showing the process of the second embodiment from continuous shooting to the generation of an intended image.

FIG. 13 is a flowchart showing the process of the present embodiment from continuous shooting to the generation of an intended image. Initially, the camera 20 is set for continuous shooting (S50), and the rotor 12 starts to be rotated (S52). Here, the camera 20 is set for two continuous shots. After the start of rotation, a first image is shot (S54) and the angle of rotation at that time is detected (S56). Next, a second image is shot (S58) and the angle of rotation at that time is detected (S60). The resulting plurality of images are input to the image processing apparatus 50 through the image input unit 52 (S62). The data on the corresponding angles of rotation is input from the photographing assist device 10 to the image processing apparatus 50 through the angle input unit 82 (S64). The images are counterrotated by the respective angles of rotation (S66). This results in a plurality of images in which the subject looks horizontal, thereby making a stereoscopic image.

If there is a user instruction to output the distance to the subject (Y at S68), the distance between the points of view is calculated (S70) and the parallaxes are detected (S72). Based on these, the distance to the subject is calculated (S74). If there is a user instruction to output an interpolated image (Y at S76), the plurality of images are interpolated (S78). According to the user instruction, any one of the stereoscopic image, the distance to the subject, and the interpolated image is output (S80).

Up to this point, the present invention has been described in conjunction with the embodiments. These embodiments are given solely by way of illustration. It will be understood by those skilled in the art that various modifications may be made to combinations of the foregoing components and processes, and all such modified examples are also intended to fall within the scope of the present invention. The following provides some of the modified examples.

In the embodiments, the rotor 12 is manually rotated for continuous shooting. In a modified example, the rotor 12 may be rotated mechanically. For example, a motor may be built in the connecting part 32 of the photographing assist device 10. The motor may be operated in synchronization with the continuous shooting of the camera 20. The synchronized operation may involve such a programmed action that the rotor 12 is temporarily halted in accordance with the timings of continuous shots, for example, at every 90° or every 180°. With the temporary halts at predetermined angular intervals, the distance(s) between the points of view can be calculated in advance. The distance data can thus be retained in a table instead of being calculated by the image processing apparatus 50.

In the second embodiment, the data acquisition unit 24 acquires the data on the angles of rotation at the respective shooting timings from the camera 20 through the first cable 25. In a modified example, the shooting timings may be acquired in a different way. For example, shooting timings may be grasped by detecting flash light, flash sound, shutter sound, etc. In another modified example, the data acquisition unit 24 may acquire the data on the angles of rotation at respective shooting timings from user instructions that are received via an external input device upon respective shots.

In the embodiments, the rotor 12 and the support 18 are given self-weights sufficient to support the camera 20. In a modified example, a weight for smoothening the rotation of the camera 20 may be attached to the rotor 12 near the outer periphery. For example, three weights may be attached near the outer periphery at every 90°. The weights may be adjusted according to the weight of the camera 20. The rotor 12 may have weight fixing parts for mounting the three weights at every 90°.

In the embodiments, the photographing assist device 10 is configured as a member separate from the support 18 which includes the tripod. In a modified example, the photographing assist device 10 may be integrated with the support 18.

The embodiments have dealt with the cases where still images are obtained by using a digital still camera or a silver film camera. In a modified example, a moving image shooting device may be mounted on the rotor 12 so that a moving image is shot during rotation. The image processing apparatus 50 acquires frames or fields of desired angles of rotation from the moving image obtained. These frames or fields may be used to achieve the generation of a stereoscopic image, an interpolated image, or the like, or distance measurement.

The embodiments are predicated on that the rotation of the rotor 12 is started before a plurality of images are shot continuously. A modified example may be predicated on that the first image is shot at an angle of rotation of 0°, and the second and subsequent images are shot after the start of rotation. Since the first image is shot in the horizontal state, it is easier to extract the object to be a horizontal reference. Second and subsequent images may be first subjected to pattern matching so that common objects extracted, if any, are used as the objects to be parallel. The angles of rotation can thus be detected by a method of higher reliability.

In the second embodiment, the angles of rotation detected are transferred to the image processing apparatus 50 via the second cable 27. In a modified example, the image processing apparatus 50 is not provided with the second cable 27, and the angles of rotation detected are transferred to the camera 20 through the first cable 25. The camera 20 stores the data on the angles of rotation in association with the shot images. The angle input unit 82 in FIG. 12 acquires the data on the angles of rotation from the camera 20, not from the photographing assist device 10.

In the first embodiment, the third angle $\delta$ is determined by detecting the relative tilt of the second image 104 with respect to the first image 102. In a modified example, the third angle $\delta$ may be determined by using other references. For example, the first angle $\theta 1$ and the second angle $\theta 2$ may be determined with reference to the subject 100 in FIG. 6, so that the third angle $\delta$ is obtained as a difference therebetween. In this case, the first angle $\theta 1$ may be determined by rotating the first image 102 until the horizon H1 becomes horizontal in the image, and the second angle $\theta 2$ by rotating the second image 104 until the horizon H2 becomes horizontal in the image. In another example, the first and second angles $\theta 1$ and $\theta 2$ may be determined to obtain the third angle $\delta$, or a difference therebetween, with reference to a third image that is shot at an arbitrary angle of rotation different from those of the first and second images 102 and 104. In this case, the first angle $\theta 1$ may be determined through pattern matching between the first image 102 and the third image, and the second angle θ2 through pattern matching between the second image 104 and the third image.

In the foregoing embodiments, the image processing apparatus 50 has the adjusting unit 73 arranged at the stage subsequent to the stereoscopic processing section 54. Nevertheless, the adjusting unit 73 may be arranged between the image input unit 52 and the stereoscopic processing section 54. In such a case, the image processing apparatus 50 may obtain homogeneous images by the adjusting unit 73 removing differences in image quality between a plurality of images acquired from the image input unit 52, before these homogeneous images are processed by the stereoscopic processing section 54.

What is claimed is:

1. An image processing method comprising: performing continuous shooting by using a camera rotatably supported by a predetermined member at timings of different angles of rotation while said member is rotated, with a direction generally perpendicular to a plane of rotation as a shooting direction, an axis of rotation of the camera being displaced from a line of the shooting direction;
   accepting a plurality of images obtained by said continuous shooting;
   extracting images of objects to be parallel with each other from said plurality of images, respectively;
   detecting the angles of rotation from tilts of said plurality of images, respectively, with reference to the images of said objects; and
   relatively rotating said plurality of images based on the angles of rotation to obtain images parallel with each other;
   wherein said predetermined member is a generally annular rotor with its circular surface as the plane of rotation;
   said camera is supported in a position near an outer periphery of said rotor, and when said rotor is rotated, makes a circular movement with a distance from the center of rotation as a radius; and
   in the performing continuous shooting, said plurality of images are shot from a plurality of positions in an orbit of said circular movement.

2. An image processing method comprising:
   performing continuous shooting by using a camera rotatably supported by a predetermined member at timings of different angles of rotation while said member is rotated, with a direction generally perpendicular to a plane of rotation as a shooting direction, an axis of rotation of the camera being displaced from a line of the shooting direction;
   detecting the angles of rotation at respective shooting timings during said continuous shooting;
   accepting a plurality of images obtained by said continuous shooting;
   acquiring data on the angles of rotation detected of said plurality of images, respectively; and
   relatively rotating said plurality of images based on the angles of rotation to obtain images parallel with each other;
   wherein the axis of rotation being displaced from the direction of shooting of the camera;
   wherein said predetermined member is a generally annular rotor with its circular surface as the plane of rotation;
   said camera is supported in a position near an outer periphery of said rotor, and when said rotor is rotated, makes a circular movement with a distance from the center of rotation as a radius; and
   in the performing continuous shooting, said plurality of images are shot from a plurality of positions in an orbit of said circular movement.

3. An image processing apparatus comprising:
   an image input unit for accepting a plurality of images shot by using a camera rotatably supported by a predetermined member from positions of different angles of rotation, with a direction generally perpendicular to a plane of rotation of said member as a shooting direction, an axis of rotation of the camera being displaced from a line of the shooting direction;
   an extracting unit for extracting images of objects to be parallel with each other from said plurality of images, respectively;
   a tilt detecting unit for detecting the angles of rotation from tilts of said plurality of images, respectively, with reference to the images of said objects; and
   a rotation processing unit for relatively rotating said plurality of images based on the angles of rotation to obtain images parallel with each other;
   wherein said predetermined member is a generally annular rotor with its circular surface as the plane of rotation;
   said camera is supported in a position near an outer periphery of said rotor, and when said rotor is rotated, makes a circular movement with a distance from the center of rotation as a radius; and
   said image input unit accepts said plurality of images shot from a plurality of positions in an orbit of said circular movement.

4. An image processing apparatus comprising:
   an image input unit for accepting a plurality of images shot by using a camera rotatably supported by a predetermined member from positions of different angles of rotation, with a direction generally perpendicular to a plane of rotation of said member as a shooting direction, an axis of rotation of the camera being displaced from a line of the shooting direction;
   an angle input unit for acquiring data on the angles of rotation; and
   a rotation processing unit for relatively rotating said plurality of images based on the angles of rotation to obtain images parallel with each other;
   wherein said predetermined member is a generally annular rotor with its circular surface as the plane of rotation;
   said camera is supported in a position near an outer periphery of said rotor, and when said rotor is rotated, makes a circular movement with a distance from the center of rotation as a radius; and
   said image input unit accepts said plurality of images shot from a plurality of positions in an orbit of said circular movement.

5. An image processing apparatus comprising:
   an image input unit for accepting a plurality of images shot by using a camera rotatably supported by a predetermined member from positions of different angles of rotation, with a direction generally perpendicular to a plane of rotation of said member as a shooting direction;
   an extracting unit for extracting images of objects to be parallel with each other from said plurality of images, respectively;
   a tilt detecting unit for detecting the angles of rotation from tilts of said plurality of images, respectively, with reference to the images of said objects;
   a rotation processing unit for relatively rotating said plurality of images based on the angles of rotation to obtain images parallel with each other;

a distance calculating unit for calculating a distance between a plurality of shooting positions based on the radius of rotation of said camera and a difference between the angles of rotation;

a parallax detecting unit for detecting a parallax between corresponding points from said plurality of images; and a distance measuring unit for measuring a distance to a subject based on the parallax and the distance between said shooting positions.

6. An image processing apparatus comprising:

an image input unit for accepting a plurality of images shot by using a camera rotatably supported by a predetermined member from positions of different angles of rotation, with a direction generally perpendicular to a plane of rotation of said member as a shooting direction;

an angle input unit for acquiring data on the angles of rotation;

a rotation processing unit for relatively rotating said plurality of images based on the angles of rotation to obtain images parallel with each other;

a distance calculating unit for calculating a distance between a plurality of shooting positions based on the radius of rotation of said camera and a difference between the angles of rotation;

a parallax detecting unit for detecting a parallax between corresponding points from said plurality of images; and a distance measuring unit for measuring a distance to a subject based on the parallax and the distance between said shooting positions.

7. The image processing apparatus according to claim 3, farther comprising an interpolation unit for interpolating said plurality of images based on the angles of rotation and the radius of rotation of said camera, thereby obtaining an image to be shot from a desired point of view.

8. The image processing apparatus according to claim 4, further comprising an interpolation unit for interpolating said plurality of images based on the angles of rotation and the radius of rotation of said camera, thereby obtaining an image to be shot from a desired point of view.

9. A computer-readable recording medium containing a program for making a computer exercise functions of:

accepting a plurality of images shot by using a camera rotatably supported by a predetermined member from positions of different angles of rotation, with a direction generally perpendicular to a plane of rotation of said member as a shooting direction, an axis of rotation of the camera being displaced from a line of the shooting direction;

extracting images of objects to be horizontal references from said plurality of images, respectively;

detecting the angles of rotation from tilts of said plurality of images, respectively, with reference to the images of said objects; and relatively rotating said plurality of images based on the angles of rotation to obtain images parallel with each other;

wherein said predetermined member is a generally annular rotor with its circular surface as the plane of rotation;

said camera is supported in a position near an outer periphery of said rotor, and when said rotor is rotated, makes a circular movement with a distance from the center of rotation as a radius; and in the performing continuous shooting, said plurality of images are shot from a plurality of positions in an orbit of said circular movement.

10. A computer-readable recording medium containing a program for making a computer exercise functions of:

accepting a plurality of images shot by using a camera rotatably supported by a predetermined member from positions of different angles of rotation, with a direction generally perpendicular to a plane of rotation of said member as a shooting direction, an axis of rotation of the camera being displaced from a line of the shooting direction;

acquiring data on the angles of rotation; and relatively rotating said plurality of images based on the angles of rotation to obtain images parallel with each other;

wherein said predetermined member is a generally annular rotor with its circular surface as the plane of rotation;

said camera is supported in a position near an outer periphery of said rotor, and when said rotor is rotated, makes a circular movement with a distance from the center of rotation as a radius; and in the performing continuous shooting, said plurality of images are shot from a plurality of positions in an orbit of said circular movement.

* * * * *